(12) United States Patent
Lippi

(10) Patent No.: US 11,993,197 B2
(45) Date of Patent: May 28, 2024

(54) VEHICLE FOR TRANSPORTING GOODS

(71) Applicant: FAYMONVILLE DISTRIBUTION AG, Waisswampech (LU)

(72) Inventor: Fabrizio Lippi, Borgo San Dalmazzo (IT)

(73) Assignee: FAYMONVILLE DISTRIBUTION AG, Luxembourg (LU)

(*) Notice: Subject to any disclaimer, the term of this patent is extended or adjusted under 35 U.S.C. 154(b) by 784 days.

(21) Appl. No.: 17/058,820

(22) PCT Filed: May 29, 2019

(86) PCT No.: PCT/IB2019/054444
§ 371 (c)(1),
(2) Date: Nov. 25, 2020

(87) PCT Pub. No.: WO2019/229668
PCT Pub. Date: Dec. 5, 2019

(65) Prior Publication Data
US 2021/0206311 A1  Jul. 8, 2021

(30) Foreign Application Priority Data

May 29, 2018 (LU) .................................... 100809

(51) Int. Cl.
*B60P 3/40* (2006.01)
*F03D 13/40* (2016.01)

(52) U.S. Cl.
CPC ............... *B60P 3/40* (2013.01); *F03D 13/40* (2016.05); *F05B 2260/02* (2013.01)

(58) Field of Classification Search
CPC ...... B60P 3/40; B60P 7/12; B60P 1/16; F03D 13/40; F05B 2260/02
(Continued)

(56) References Cited

U.S. PATENT DOCUMENTS 2,808,288 A * 10/1957 Benson .................... B60P 1/14
410/94
8,961,085 B2  2/2015 Ressel et al.
(Continued)

FOREIGN PATENT DOCUMENTS

DE    102009040200 A1   3/2011
EP         1798104 A2   6/2007
(Continued)

OTHER PUBLICATIONS

PCT International Search Report and Written Opinion issued by the International Bureau for PCT Application No. PCT/IB2019/054444, dated Sep. 27, 2019, pp. 1-13.
(Continued)

*Primary Examiner* — Stephen T Gordon
(74) *Attorney, Agent, or Firm* — The Belles Group, P.C.

(57) ABSTRACT

A goods vehicle has a chassis with at least one load deck, a plurality of steerable carriages underneath the load deck and an attachment and support assembly for the load, to be transported, supported by the chassis; the attachment and support assembly being provided with an attachment head for the load to be transported, a multiple-bar kinematic system for coupling the support head to the chassis and an actuator for moving the support head with respect to the chassis with a roto-translational motion; the support head being coupled to the kinematic system by means of a hinge having a movable hinge axis.

10 Claims, 5 Drawing Sheets

(58) Field of Classification Search
USPC .................................. 410/44, 45, 36, 42, 47
See application file for complete search history.

(56) References Cited

U.S. PATENT DOCUMENTS

| | | |
|---|---|---|
| 2013/0121780 A1 | 5/2013 | Ressel et al. |
| 2013/0142585 A1* | 6/2013 | Yogodzinski ............. B60P 3/40 410/44 |
| 2014/0050547 A1* | 2/2014 | Hiremath .................. B60P 7/12 410/44 |
| 2017/0267149 A1 | 9/2017 | Lee et al. |

FOREIGN PATENT DOCUMENTS

| | | |
|---|---|---|
| EP | 3219983 A1 | 9/2017 |
| JP | 2013524085 A | 6/2013 |
| WO | WO2013/086770 A1 | 6/2013 |

OTHER PUBLICATIONS

Office Action issued in Japanese Application No. 2021-517120.

\* cited by examiner

VEHICLE FOR TRANSPORTING GOODS

CROSS-REFERENCE TO RELATED PATENT APPLICATIONS

The present application is a U.S. national stage application under 35 U.S.C. § 371 of PCT Application No. PCT/IB2019/054444, filed May 29, 2019, which claims priority to Luxembourg Patent Application No. 100809, filed May 29, 2018. The disclosures of the aforementioned priority applications are incorporated herein by reference in their entireties.

TECHNICAL FIELD

The present invention relates to a vehicle for transporting goods.

In particular, the present invention relates to a vehicle for transporting special loads and, specifically, elongated bodies such as, for example, wind turbine blades, to which the following discussion will make explicit reference without thereby any loss of generality.

BACKGROUND ART

For transporting a wind turbine blade, whose length can reach seventy metres, it is known to use wheeled vehicles of the type comprising a chassis defining a load deck or a load plane, a plurality of wheeled bogies or carriages arranged below the load deck and coupled to the chassis by means of respective vertical-axis fifth wheel couplings and an attachment and support assembly for the wind turbine blade to be transported.

The attachment and support assembly extends over a longitudinal end section of the load platform and comprises an attachment structure stably attached to the chassis and a support head to which an end section or foot section of the wind turbine blade to be transported is attached. The wind turbine blade thus extends cantilevered from the head, partly above the remaining load deck and partly beyond the vehicle.

During transport along almost straight routes, the blade is kept horizontal and, preferably, resting on the load deck. If however the route is tortuous or the transport requires maneuvering in relatively restricted spaces or when large fixed obstacles are foreseen along the route, the free end of the blade is raised with respect to the load deck in order to avoid collisions.

For this reason, the head is hinged to the attachment structure by a hinge with a fixed horizontal hinge axis and rotated about the fixed hinge axis generally by means of a linear hydraulic actuator configured to exert a pushing force on the head.

In order to ensure stability of the vehicle whatever the angular position of the wind turbine blade with respect to the load deck and therefore whatever the height of the centre of gravity of the wind turbine blade, both fixed and adjustable ballast or stabilisation masses are placed on said load deck, for example, moving towards and away from the attachment head.

Although used, the known transport vehicles of the type described above prove to be rather unsatisfactory as they have limits both on the obstacles that can be bypassed and on the transportable load.

The above is partly due to the construction characteristics of the attachment and support assembly for the wind turbine blade and partly due to its location on the load deck.

Rotation of the wind turbine blade above the load deck inevitably raises the centre of gravity of said wind turbine blade. As the centre of gravity progressively rises, the vehicle's stability gradually decreases as a result. Up to a certain angle of the wind turbine blade, generally approximately 60°, stability is ensured by selecting and positioning ballast masses on the load deck or by adjusting the longitudinal position of the ballast masses on the load deck as the inclination changes. Besides said inclination, further increase in the ballast weights, on the one hand reduces the transportable load, and on the other hand increases consumption and makes maneuvering operations, which are already extremely complex, more difficult.

For these reasons, the angle of inclination of the wind turbine blade with respect to the load deck is limited to a compromise angle of approximately 60°-65°, accepting, however, the impossibility of bypassing any obstacle, which may arise along the path of travel.

In addition to this, the attachment and support assembly for the wind turbine blade is particularly unwieldy in height even when arranged in its resting position. In particular, many of the known attachment and support assemblies are elevated at rest, i.e. without a load on board, to heights of more than four metres, a height above which transport is considered to be exceptional. It follows that, even during unladen journeys, transport is always considered as exceptional transport with the relevant costs and requirements, which, as is well known, are much more onerous than the costs and requirements in the case of a non-exceptional journeys.

DISCLOSURE OF INVENTION

The objective of the present invention is to provide a vehicle for transporting goods, which makes it possible to resolve the above problems simply and economically.

According to the present invention, a vehicle for transporting goods is provided, as described herein.

BRIEF DESCRIPTION OF THE DRAWINGS

The invention will now be described with reference to the accompanying drawings which illustrate a non-limiting embodiment example, wherein.

BEST MODE FOR CARRYING OUT THE INVENTION

Figure 1:
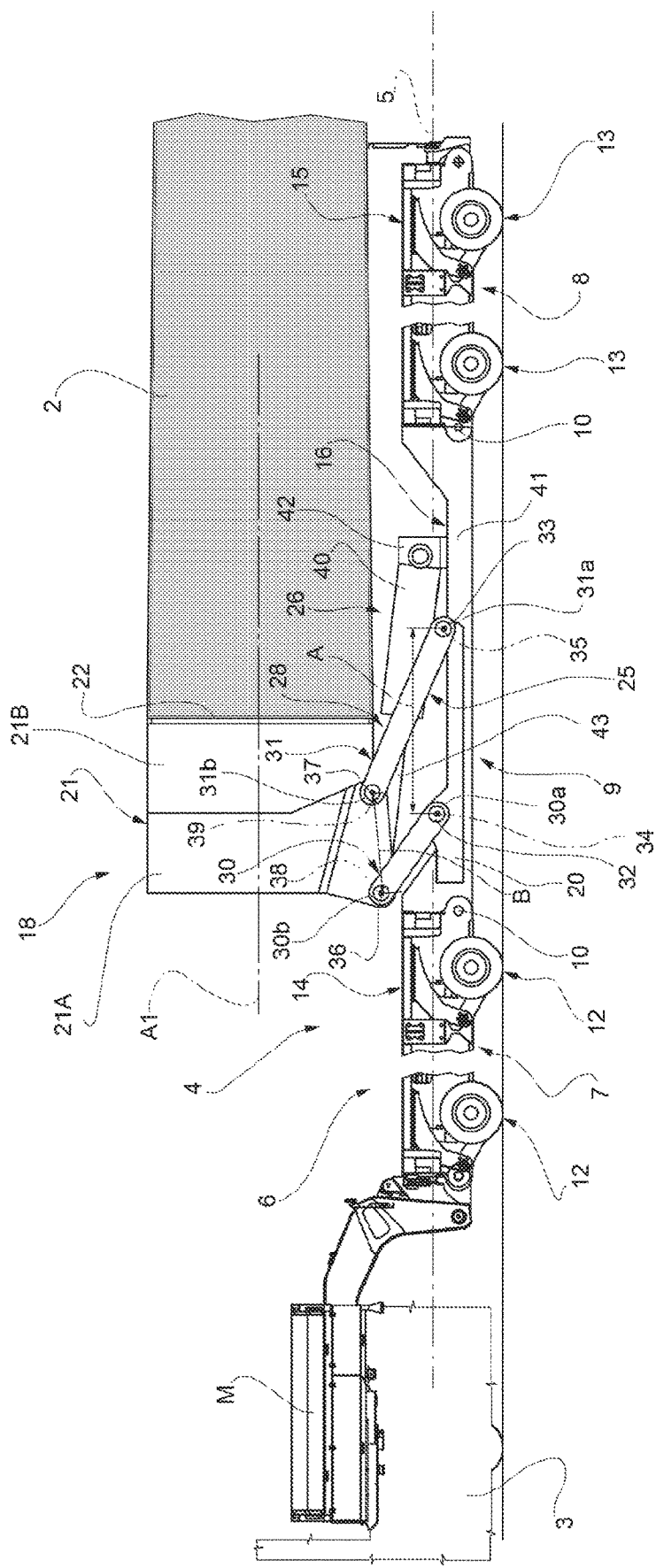
FIG. 1 shows, schematically and substantially in blocks and in lateral elevation, a preferred embodiment of a vehicle for transporting goods realised according to the dictates of the present invention.

In the attached Figures, the number 1 indicates, in its entirety, a vehicle for transporting goods, in particular a wind turbine blade 2, to which the following discussion will make explicit reference without thereby incurring any loss of generality.

In particular, the vehicle 1 comprises a tractor 3, which is itself known, and a semi-trailer 4 connected to the tractor 3 via a method, which is also known.

The semi-trailer 4 has its own longitudinal axis 5 and comprises a chassis 6, in turn comprising a front structure 7 extending from the tractor 3, a rear structure longitudinally spaced from the front structure along the axis 5 and an intermediate structure 9 connecting the front structure 7 to the rear structure 8. The intermediate structure 9 is stably connected to the structures 7 and 8 in a releasable manner, for example by means of pins 10.

The front structure 7 and the rear structure 8, conceptually the same as each other, carry coupled respective pluralities of steerable bogies or carriages 12 and 13, only a part of which is visible in the attached Figures, which are known and not described in detail. The structures 7 and 8 define respective horizontal load decks or load planes, indicated respectively by 14 and 15. The load decks or load planes 14 and 15 are coplanar, i.e. they are positioned at the same height from the ground.

The intermediate structure 9 is a bridge structure without bogies or carriage, is lowered with respect to the structures 7 and 8, and has its own horizontal load deck or load plane 16, which is lowered with respect to the load decks 14 and 15, i.e. positioned at a height above the ground less than that of the decks 14 and 15. Conveniently, the load deck 16 is lowered by fifty centimetres with respect to the decks 14 and 15.

The vehicle 1 further comprises an attachment and support assembly 18 for the wind turbine blade 2 to be transported.

Figure 3:
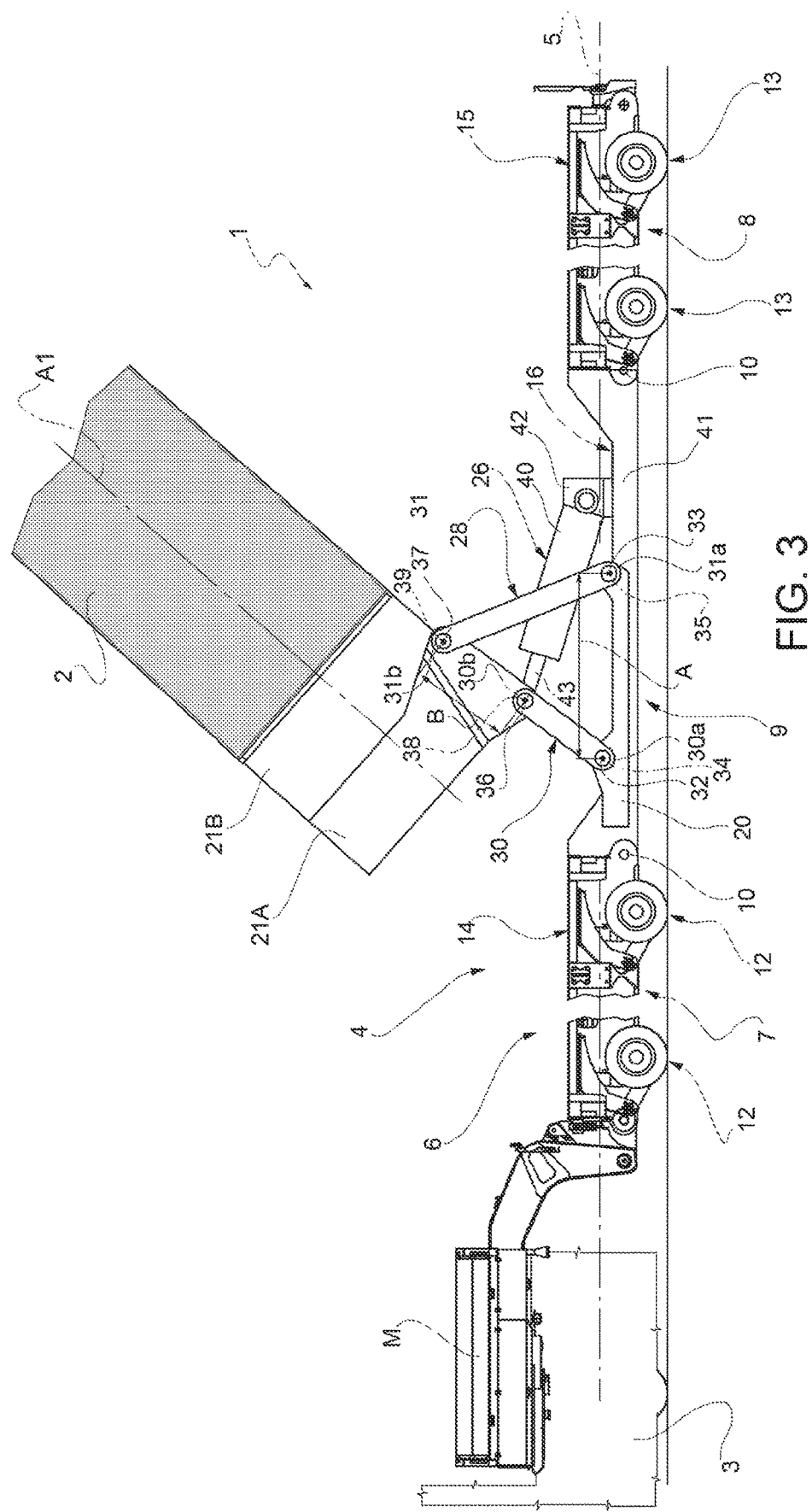
Figure 4:
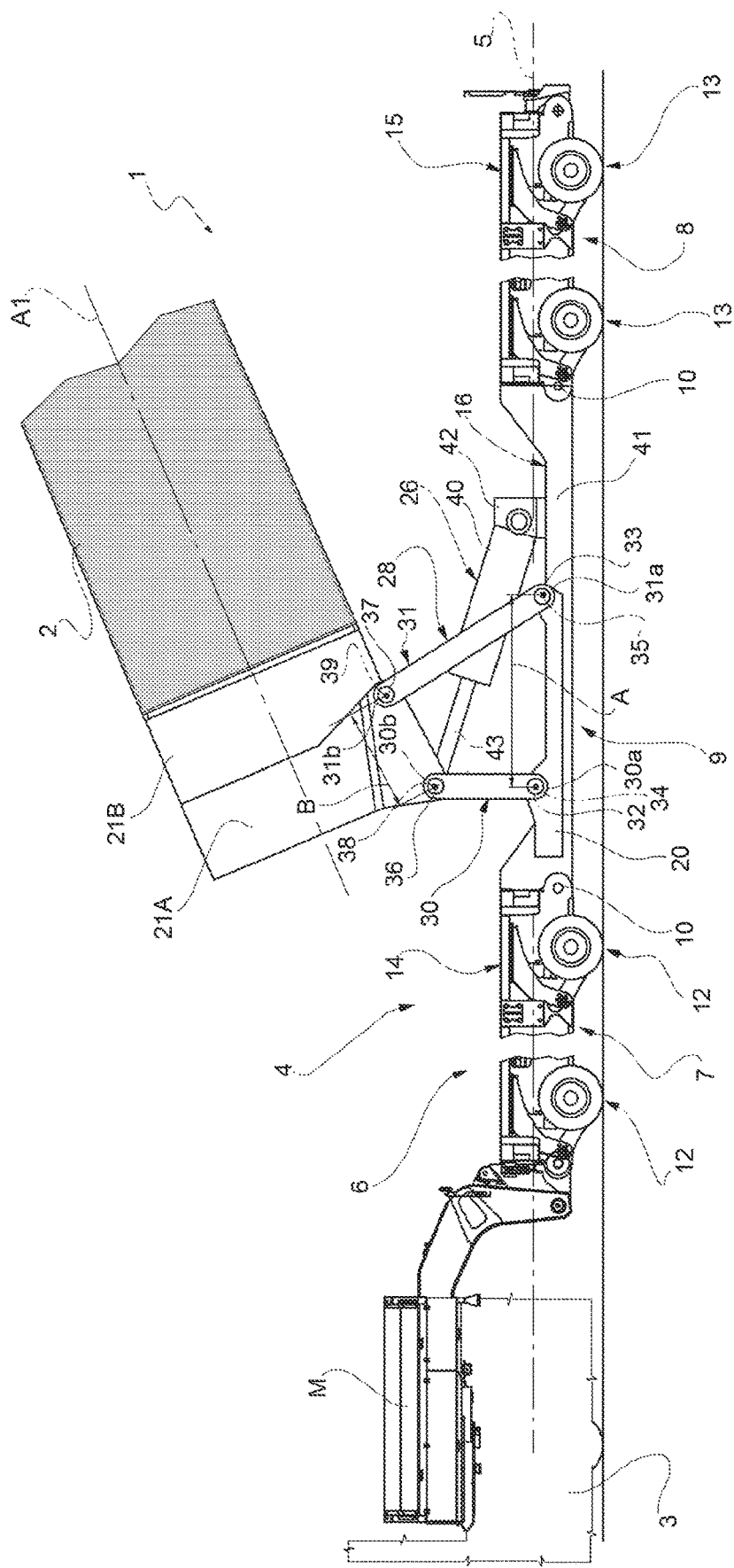

The assembly 18 is arranged on the load deck 16 of the intermediate structure 9 and comprises its own attachment structure or interface structure 20 stably connected to the structure 9 and a support and handling head 21 for the wind turbine blade 2. The head 21 is preferably cylindrical in shape, has its own axis A and comprises an end portion 21A coupled to the structure 20 and an opposite end portion indicated with 21B, which is itself known and not described in detail and is configured to couple with a foot portion 22 of the wind turbine blade 2 so as to provide cantilevered support for the wind turbine blade 2 (FIGS. 3 and 4).

The assembly 18 further comprises a bar mechanism 25 of the four-bar linkage or quadrilateral articulated type coupling the portion 21A of the head 21 to the structure 20. The assembly 18 further comprises a hydraulic jack 26 interposed between the portion 21A and the structure 9 and cooperating with the mechanism 25 to impart to the head 21 a roto-translational motion with respect to the structures 9 and 20 and to the load decks 14, 15 and 16, as will be better described below.

Conveniently, the mechanism 25 comprises a pair of four-bar linkage kinematic or quadrilateral articulated systems 28 arranged on opposite sides of the jack 26.

Each of the four-bar linkage kinematic systems 28 comprises two respective bars, indicated respectively by 30 and 31. The bar 31 is longer than the bar 30.

The bars 30, 31 perform a lever function and have respective lower end portions 30a and 31a hinged to the attachment structure 20 via respective pins 32 and 33 to pivot about their fixed hinge axes, indicated respectively by 34 and 35.

According to one variant, the assembly 18 lacks the attachment structure 20 and the bars 30 and 31 are hinged directly to the structure 9.

In both solutions, the axes 34 and 35 are orthogonal to the axis 5 and parallel to each other and to the decks 14,16 and are positioned at a distance A from each other.

The bars 30 and 31 further have respective end portions 30b and 31b opposite to the portions 30a and 31a and hinged to the head 21 by means of respective pins 36 and 37 so as to rotate about their respective movable hinge axes, indicated by 38 and 39.

The movable axes 38 and 39 are parallel to each other and to the axes 34 and 35 and are positioned at a distance B from each other, which is shorter than the distance A.

Figure 5:
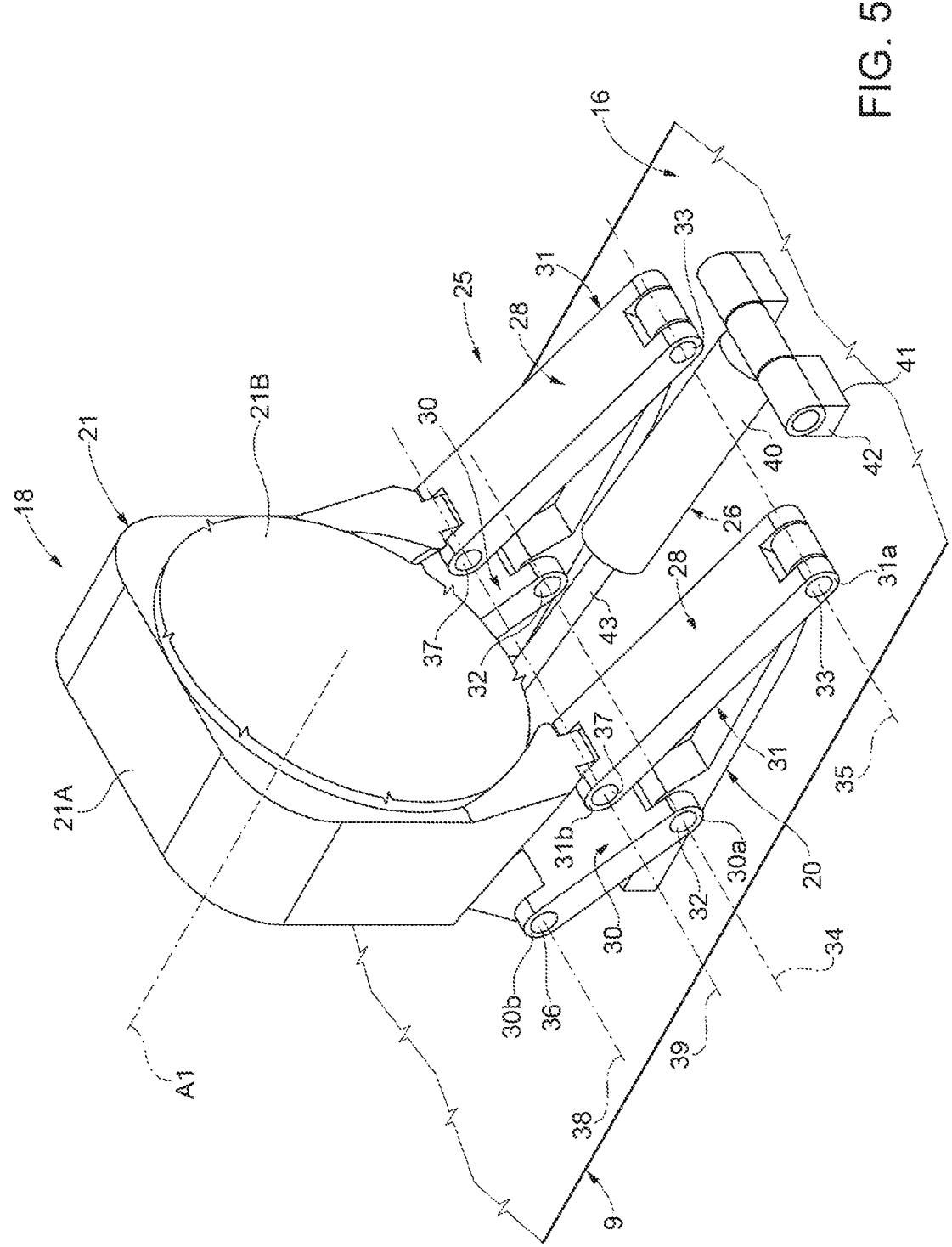
FIG. 5 is a perspective view in enlarged scale of a detail of FIGS. 1 to 4.

With reference to the attached Figures and, in particular, FIG. 5, the hydraulic jack 26 is positioned above the deck 16 between the two kinematic systems 28 and, conveniently, has a sleeve 40 hinged to an intermediate portion 41 of the structure 9 close to the rear chassis 8 by means of a fork 42. The actuator 26 has a rod 43, which is hinged to the head 21 by the pin 36. According to a variant, the rod 43 is hinged to the head 21 by a dedicated pin parallel to the pin 36.

Figure 2:
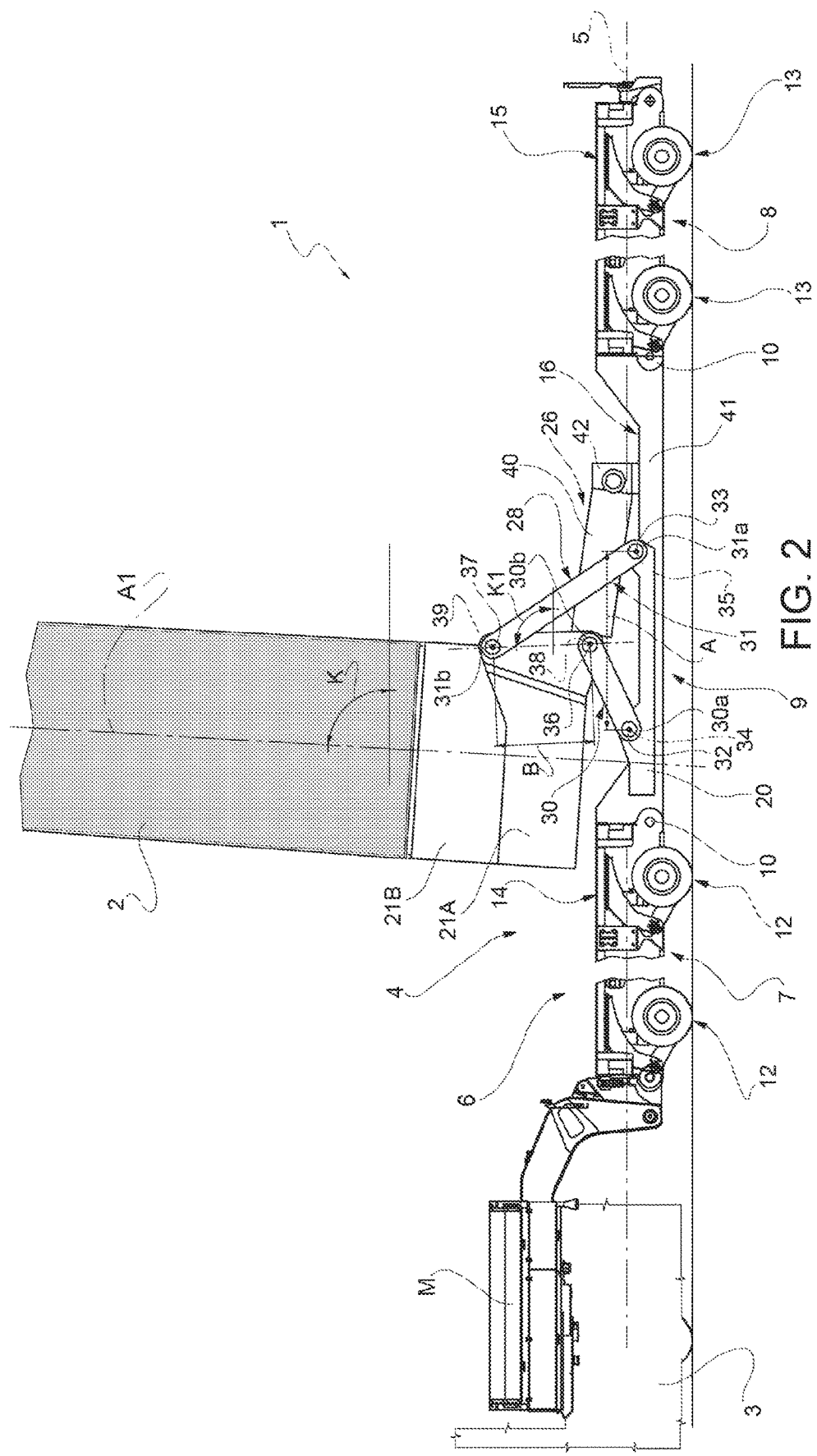
FIGS. 2 to 4 are similar Figures to FIG. 1 and show the vehicle of FIG. 1 in three different functional conditions.

During a journey, by activating the hydraulic jack 26, it is possible to move the head 21 between two extreme longitudinal end-of-travel positions, one reclining, shown in FIG. 1, and the other tilted, shown in FIG. 2. During the transition between the reclining position and the tilted one, the head 21 performs a roto-translation motion as a result of the fact that both the movable hinge axes 38 and 39 describe respective circular trajectories, having different respective radii and respective centres each lying on a respective fixed hinge axis 34, 35. The movable hinge axes 38 and 39 move, therefore, in two directions, one parallel to the axis 5 and to the decks 14 and 15 and the other vertical and orthogonal to said decks 14 and 15.

When the head 21 is arranged in its reclining position, the wind turbine blade 2 extends above the deck 15, the axis A extends in a position substantially parallel to the decks 14 and 15, the portions 21A and 21B both overlay solely the load deck 16 and are arranged beyond the decks 14 and 15 and the portion 21A of said head 21 is turned towards the tractor 3 and towards the front structure 7 and approaches and is tangent to an extension of said decks 14 and 15.

Again, when the head 21 is arranged in the reclining position, the movable axes 38 and 39 approach the aforementioned extension of the decks 14 and 15 and the axis 39 is arranged in a raised position with respect to the axis 38, as shown in FIG. 1. In this reclining position, the bars 30 and 31 of the mechanism 25 then converge towards each other, forwards with respect to the direction of travel, and upwards so that their extensions intersect with each other above the deck 14.

Furthermore, when the head 21 is arranged in its reclining position, the rod 43 of the hydraulic jack 26 is in a condition of maximum extension.

When, conversely, the head 21 is arranged in its tilted position, the portion 21A partially overlays and faces the decks 14 and 16, and the axis A and thus the wind turbine blade 2 reach a condition of quasi-verticality and, preferably, the axis A forms an angle K with the deck 14 which varies between 80° and 90°, and is conveniently 86°. Still with the head 21 in the tilted position, the movable axis 39 extends above the movable axis 38. Conveniently, the axes 38 and 39 lie in a practically vertical plane or orthogonal to the deck 14 forming an angle K1 with the deck 16. Conveniently, the angle K1 varies between 80° and 110°.

Again, in the tilted position, the extension of each of the bars 30 intersects the respective bar 31 and the actuator rod 43 is in a fully retracted or inserted condition.

From the above it is evident, first of all, that, during the tilting of the head 21, the rod 43 is practically never subjected to peak load. This is due to the fact that the rod 43 is in tension as long as the centre of gravity of the head-wind turbine blade combination does not remain to the right of the vertical plane passing through the movable axis 39. In the example shown, this condition is fulfilled as long as the angle K remains smaller than approximately 82°-85°. In this condition, however, the rod 43 is practically retracted and is therefore insensitive to peak loads. The result is high reliability and high positioning stability, but above all an efficiency, which is invariant over time since the rod 43, is constantly placed under tension during almost all of its stroke.

In addition to this, the particular method of connecting the head 21 to the chassis 6 and, specifically, the configuration of the kinematic systems 28 does not impose limits on the raising of the wind turbine blade 2. This is essentially due to the fact that during the transition of the head from the reclining condition to the tilted condition, the height from the ground of the centre of gravity of the wind turbine blade 2 and of the head 21, unlike the known solutions with a fixed hinge axis, increases until the bars 30 do not reach a vertical condition (FIGS. 3 and 4) but then decreases again progressively, thus rendering control of the stability of the vehicle 1 easy even with the wind turbine blade 2 in a condition of substantial verticality.

In addition to this, control of stability is facilitated by the fact that the kinematic system rests on a lower plane than the load decks 14, 15 of the vehicle 1. It is evident that, in this way, the centres of gravity of the wind turbine blade 2 and of the entire attachment and support assembly 18 are, still with respect to the known solutions, arranged lower than the load decks when the head 21 is in its reclining position and the blade 2 is arranged horizontally.

The fact that the attachment and support assembly 18 is arranged on a deck 16 which is lower than the load decks 14, 15, further makes it possible, still with respect to the known solutions, for the load to be transported at a lower height from the ground. Moreover, in the absence of a load and when the head 21 is in the reclining position, the maximum height of the vehicle 1 above the ground remains below four metres, so that unladen journeys do not fall into the category of exceptional transport according to the current land transport regulations, unlike in known solutions.

Finally, it has been verified experimentally that the stability of the vehicle 1 is ensured irrespective of the angular position of the blade 2 with respect to the load decks 14 and 15, with reduced ballast loads than the existing transport solutions and, in particular, with placement of a single ballast mass M on the part of the chassis 6 overhanging the tractor 3. This is made possible by the fact that, with respect to the known solutions, in the vehicle 1 described, the head 21 and the transportable mass are lower down than the load decks 14 and 15. This means that, on the one hand, in equal stability conditions, the transportable load can be increased and, on the other, the load decks 14 and 15, used for ballast weights in the known solutions, are free for other uses in the vehicle 1.

Finally, it is clear from the preceding that the vehicle 1 described may be subject to modifications and variations without thereby departing from the protective scope defined in the claims.

In particular, the attachment portion of the semi-trailer 4 to the tractor 3 could be modified to make the semi-trailer described an ordinary trailer.

Furthermore, said tractor 3 could be absent and the vehicle 1 could be configured as a self-propelled vehicle or unit that could be controlled by radio remote control; in this case, the assembly 18 could also be supported by an extension of the chassis 6 protruding forwards and cantilevered from the front structure 7.

In any case, the chassis 6 could comprise only the front structure 7, the structure 20 being placed on the load deck 14 and the sleeve 40 of the actuator 26 being coupled to said front structure 7.

Furthermore, the load deck 16 of the intermediate structure 9 could be raised and made coplanar with the support decks 14 and 15. Finally, the single hydraulic jack 26 could be replaced with several hydraulic jacks still arranged between the two kinematic systems so as to accommodate, as in the solution described, the space required for the assembly 18, or in different positions from that indicated.

In addition, the jack 26 or other hydraulic jacks could have their sleeves hinged to the interface structure 20; in this case, the attachment and support assembly 18 would be a unit separate and independent from the chassis 6 and thus easily removable for adapting the vehicle to other uses, or for placing it on a chassis of another vehicle, for example a conventional vehicle, by resting it on the load deck provided and securing it thereto. Again, the jack and part of the kinematic systems 28 could be replaced with other actuator mechanisms, for example screw-nut systems, for moving the head with roto-translational motion.

Finally, the vehicle 1 described could be used for the transport of extended bodies other than wind turbine blades, configuring the portion 21B of the head 21 in such a way as to be coupled, from time to time, to the elongated body to be transported.

The invention claimed is:

1. A vehicle for transporting goods, the vehicle comprising:
   a chassis comprising: at least one load deck and extending along a longitudinal axis,
   a plurality of steering bogies arranged underneath said load deck, and
   an attachment and support assembly for attaching and supporting the goods, the attachment and support assembly being supported by said chassis; the attachment and support assembly comprising:
   a support head, to support the goods,
   an apparatus coupling said support head to said chassis, and
   an actuation device operable to move the support head with respect to the chassis;
   said apparatus comprising a first hinge having a first hinge axis, horizontal and transverse to said longitudinal axis,
   wherein said first hinge and said first hinge axis are movable with respect to said chassis along a first circular path;
   wherein said apparatus further comprises a second movable hinge having a second movable hinge axis, parallel to said first movable hinge axis, spaced apart radially from said first movable hinge axis, movable together with said first movable hinge axis, and movable along a second circular path having a radius other than the radius of said first circular path; and
   wherein said actuation device comprises an actuator having a rod acting on said support head and configured to exert a tensile force on said support head towards said chassis at least during operations of moving said support head to and from a reclined load-bearing position, which is substantially horizontal.

2. The vehicle according to claim 1, wherein the radius of said second circular path is greater than the radius of said first circular path.

3. The vehicle according to claim 1, wherein the first movable hinge axis is movable along said first circular path between first and a second end-of-travel positions corresponding respectively to said reclined load-bearing position and to a tilted position of the support head; in both said first and second end-of-travel positions, the first movable hinge axis being arranged alongside said load deck or alongside an extension of the load deck.

4. The vehicle according to claim 3, wherein said second movable hinge axis is higher than said first movable hinge axis, whatever the position of the support head with respect to said chassis.

5. The vehicle according to claim 1, wherein the apparatus comprises a pair of four-bar linkage kinematic systems, arranged on opposite sides of said support head; each of said four-bar linkage kinematic systems comprising a respective first bar and a respective second bar; said second bar having a length different from the length of said first bar; said first and second bars having respective first end portions coupled to the chassis to pivot, respectively, about first and a second fixed hinge axes parallel to each other and spaced apart longitudinally, said first and second bars having respective second end portions, which are opposite with respect to the first end portions and are hinged to said support head to rotate, respectively, about said first and second movable hinge axes.

6. The vehicle according to claim 5, wherein the distance between said first and second fixed hinge axes is greater than the distance between said first and second movable hinge axes.

7. The vehicle according to claim 1, wherein said chassis comprises a lowered portion delimited at the top by a supporting surface, which is lower than said load deck; said attachment and support assembly being arranged on said supporting surface and being stably secured to said lowered portion.

8. The vehicle according to claim 7, wherein the chassis comprises a further load deck; the load deck and the further load deck being arranged along said longitudinal axis and on longitudinally opposite sides of said lowered portion.

9. The vehicle according to claim 5, wherein said attachment and support assembly comprises an interface structure stably connected to said chassis; said first and second bars being hinged to said interface structure to rotate, respectively, about said first and second fixed hinge axes.

10. An attachment and support assembly for goods to be transported and suitable to be coupled to a vehicle chassis; the attachment and support assembly comprising:
an interface structure suitable to be connected to said vehicle chassis,
a support head for supporting the goods to be transported,
an apparatus coupling said support head to said interface structure, and
an actuation device operable to move said support head with respect to the interface structure;
said apparatus comprising a first hinge having a first hinge axis, horizontal and transverse to a longitudinal axis,
wherein said first hinge and the first hinge axis are movable with respect to said interface structure along a first circular path;
wherein said apparatus further comprises a second movable hinge having a second movable hinge axis, parallel to said first movable hinge axis, spaced apart radially from said first movable hinge axis, movable together with said first movable hinge axis, and movable along a second circular path having a radius other than the radius of said first circular path; and
wherein said actuation device comprises an actuator having a rod acting on said support head and configured to exert a tensile force on said support head towards said vehicle chassis at least during the operations of moving said support head to and from a reclined load-bearing position, which is substantially horizontal.

* * * * *